Figure 6:
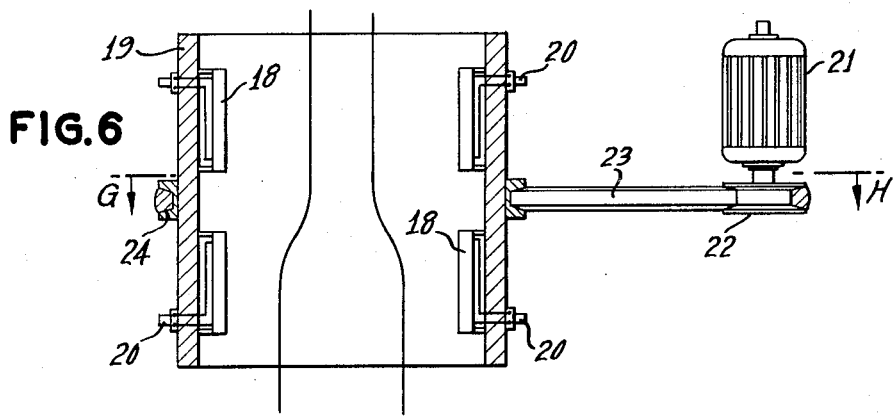

United States Patent [19]
Seifried et al.

[11] 3,725,519
[45] Apr. 3, 1973

[54] PROCESS FOR THE CONTINUOUS PRODUCTION OF MULTIAXIALLY STRETCHED TUBULAR FILMS OF LINEAR POLYESTERS

[75] Inventors: Walter Seifried; Ludwig Klenk, both of Wiesbaden-Biebrich, Germany

[73] Assignee: Kalle Aktiengesellschaft, Wiesbaden-Biebrich, Germany

[22] Filed: Nov. 18, 1969

[21] Appl. No.: 871,686

Related U.S. Application Data

[63] Continuation of Ser. No. 433,640, Feb. 18, 1965, abandoned.

[30] Foreign Application Priority Data

Feb. 21, 1964 Germany .......................... R 52170

[52] U.S. Cl. .................. 264/25, 264/40, 264/89, 264/95, 264/210 R, 264/237, 264/289, 425/72
[51] Int. Cl. ...... B29d 7/24, B29c 25/00, B29d 23/04
[58] Field of Search ........ 264/95, 40, 89, 237, 209, 210 R, 264/289, 25; 425/72

[56] References Cited

UNITED STATES PATENTS

| | | |
|---|---|---|
| 2,947,031 | 8/1960 | Ho Chow et al. .................. 264/95 |
| 3,090,998 | 5/1963 | Heisterkamp et al. .................. 264/95 |
| 3,141,912 | 7/1964 | Goldman et al. .................. 264/95 |
| 3,151,358 | 10/1964 | Gerber .................. 18/14 |
| 3,180,909 | 4/1965 | Looser .................. 264/95 |
| 3,268,640 | 8/1966 | Gerber .................. 264/95 |
| 3,300,555 | 1/1967 | Bild et al. .................. 264/95 |
| 3,412,189 | 11/1968 | Sullivan .................. 264/95 |

FOREIGN PATENTS OR APPLICATIONS

632,717  11/1963  Belgium .................. 264/95

Primary Examiner—Robert F. White
Assistant Examiner—Jeffery R. Thurlow
Attorney—James E. Bryan

[57] ABSTRACT

This invention relates to a process for the continuous production of a multiaxially stretched tubular film of a thermoplastic linear polyester having a low melt viscosity by extruding a melt of the polyester in a substantially vertically downward direction from an annular die at a speed $v_0$ onto an interior calibrating core of a diameter smaller than that of the die while stretching the melt in the longitudinal direction, cooling the melt to form a substantially unoriented tube which engages the core in a gas-tight manner, conveying the tube at a speed $v_1 > v_0$ to a heated stretching zone in which the tube is heated to stretching temperature, stretching the tube by means of a further increase in linear speed $v_2 > v_1$ and by increasing the pressure in the tube, and cooling the tube.

5 Claims, 13 Drawing Figures

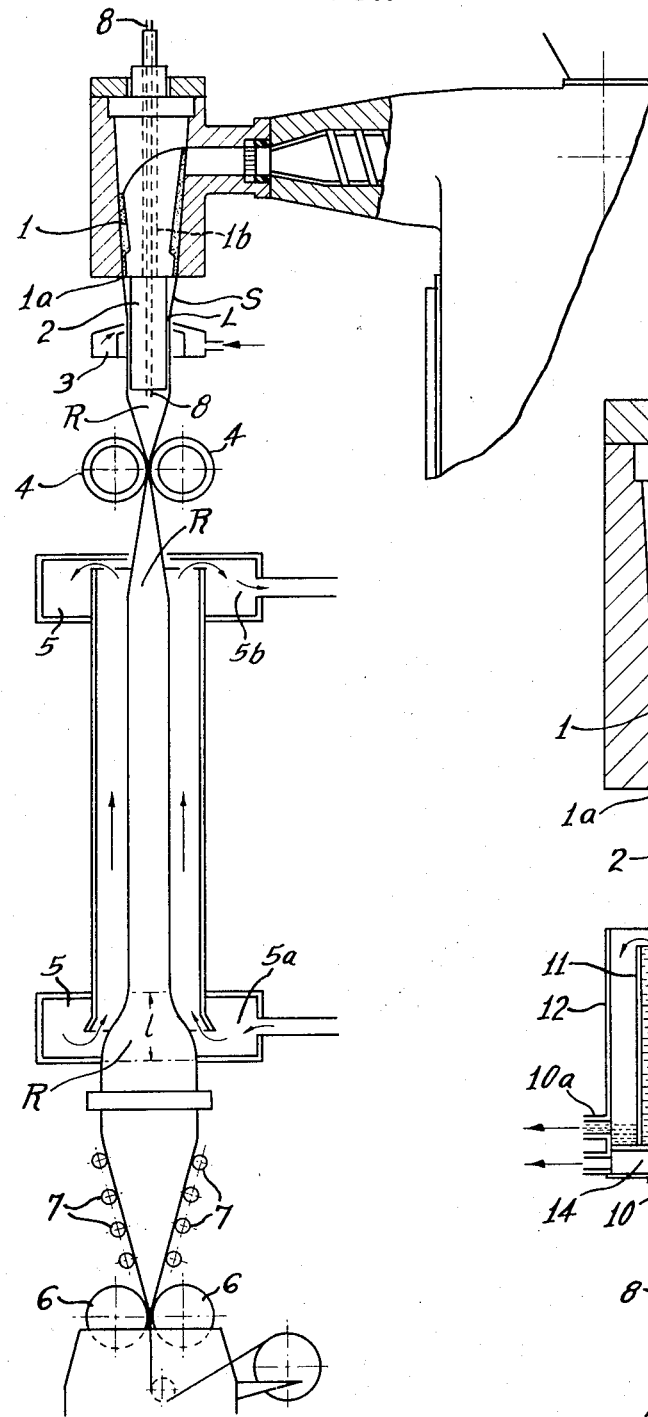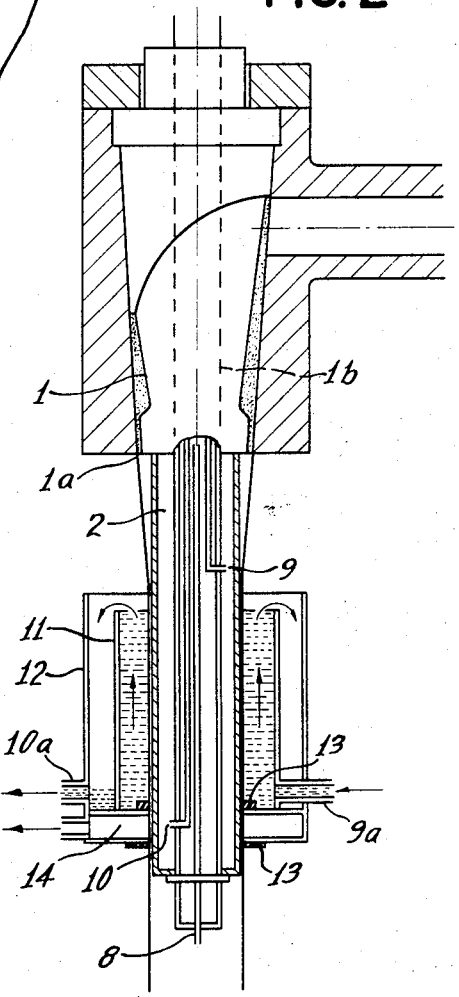

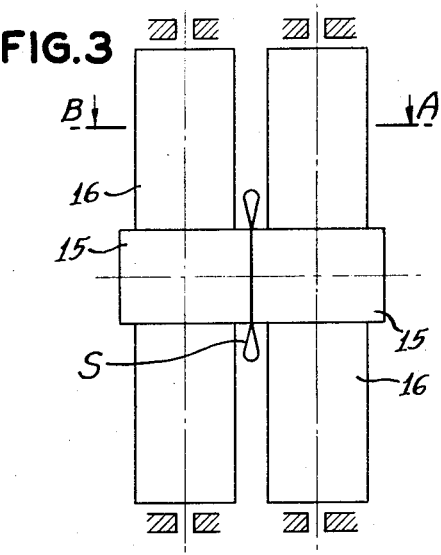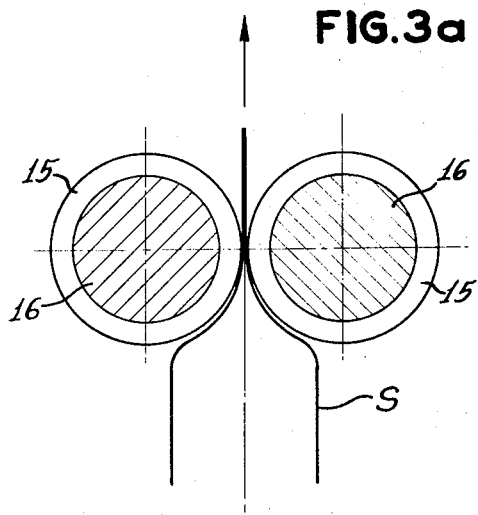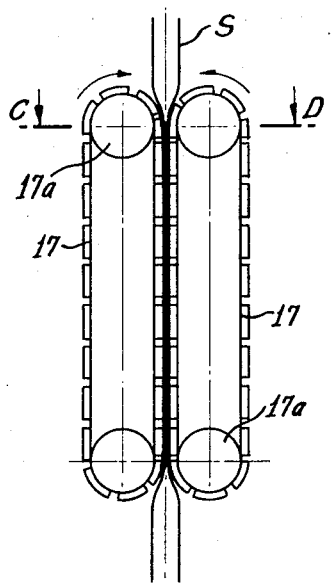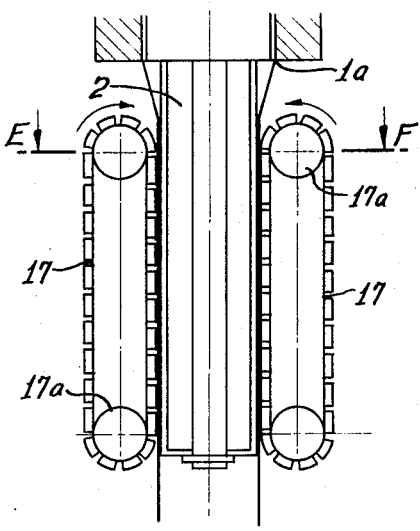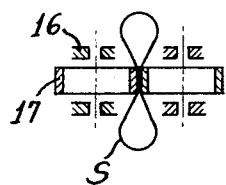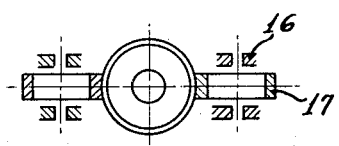

INVENTORS
Walter Seifried
Ludwig Klenk
BY
James E. Bryan
ATTORNEY

PROCESS FOR THE CONTINUOUS PRODUCTION OF MULTIAXIALLY STRETCHED TUBULAR FILMS OF LINEAR POLYESTERS

This is a continuation of Ser. No. 433,640, filed 2/18/65, now abandoned.

It is well known that thermoplastic, crystallizable linear polyesters maintain their amorphous state when a melt thereof is rapidly cooled below the glass transition temperature and can be converted into a partially crystalline state by subsequent heating or mechanical orientation. The temperature must be raised to a value below the melting point of the plastic material, but above its glass transition temperature. In the immediate vicinity of their melting points, these polyesters display a marked loss of viscosity and form highly fluid melts, capable of flowing under their own weight.

Known processes for the production of multiaxially stretched tubular films from these polyesters comprise two consecutive operations. During the first operation, an unoriented, amorphous tubular film is produced; in a second, subsequent operation, this tubular film is oriented by stretching. These operations are performed in two consecutive zones and an excess pressure applied to the interior of the tube which in the first zone, i.e. during the production of the unoriented tube, is lower than in the second zone, i.e. during the production of the oriented tube. The first zone is delimited by the die slot and a first pair of squeeze rolls, and the second zone by this first and a second pair of squeeze rolls. These squeeze rolls not only serve to convey the tubular film, but at the same time operate as a seal between the two zones of different pressure and, owing to their different speeds of rotation, cause the tube to be stretched in the longitudinal direction. The delivery speed of the unoriented film, and the operating speed of the unoriented film, in turn, is lower than that of the oriented film.

During the first operation, the tubular film extruded from the annular die into the first zone is expanded by a volume of gas introduced under pressure into the interior thereof. In view of the low viscosity of the melt immediately after extrusion from the annular die, this pressure must be low. The desired thickness of the film is determined by the degree of transverse extension, i.e. the ratio of the tube diameter to the diameter of the die, and the degree of longitudinal extension, i.e. by the ratio of the draw-off speed of the tubular film caused by the first pair of squeeze rolls and the delivery speed of the melt from the annular die. In order that the amorphous qualities of the polyester forming from the melt may be maintained, the extruded tubular film is rapidly cooled upon leaving the annular die, either from the outside, or from the outside and from within.

Subsequently, the unoriented tube is conveyed to the second zone where stretching is performed. For this purpose, the amorphous tubular film, after being conveyed by the first pair of squeeze rolls from the first zone to the second zone, is heated to the most suitable temperature for stretching, cooled during or after stretching, respectively, in order to maintain in the partially crystalline state the orientation of the tube obtained by the stretching operation, collapsed, and then drawn off by the second pair of squeeze rolls which impart a higher speed to the tube. The ratio of the speed of the second pair of squeeze rolls divided by that of the first pair corresponds to the ratio of stretching. The force required for stretching is provided by the drive of the squeeze rolls. Transverse stretching is performed by the volume of gas included in the interior of the tube. Due to the force required for stretching, this gas volume is under a relatively high pressure. The ratio of the diameter of the transversely stretched tube and that of the unstretched tube corresponds to the ratio of transverse stretching of the stretched tube. The product of longitudinal and transverse stretching is the ratio of stretching per unit area.

In this known process, only relatively low pressures can be applied in the first zone, in the interest of exact shaping, because the plastic tube extruded from the annular die is of low mechanical strength owing to the low viscosity of the melt and its elastic qualities have not yet completely developed, whereas, in the second zone, relatively high pressures must be applied for stretching the solidified amorphous tube. In this process, it is difficult to introduce into the second zone the gas required for stretching and to seal from each other the two zones with different gas pressures. In most cases there is an undesirable exchange of pressure between the second zone with higher gas pressure and the first zone with lower gas pressure, which causes a loss of gas pressure in the stretching zone. This loss of gas pressure is noticeable by a so-called leakage current from the second zone to the first zone which causes continually changing pressures in the stretching zone and thus different ratios of stretching. Further, the pressure in the stretching zone requires constant control. Nor is it possible to obtain a tight seal between the two pressure zones by using a drag plug, as is known in the production of other film materials.

By the method and apparatus of the present invention, the process is simplified and rendered more reliable by means of relatively little technical expenditure. Further, tubular films are obtained which have particularly uniform geometrical dimensions.

In the process of the present invention, no interior pressure is applied for the formation of the unstretched tube, so that the first zone of pressure can be dispensed with. The process of the present invention for the continuous production of multiaxially stretched tubular films of thermoplastic linear polyesters having low melting viscosities comprises extruding the polyester melt with a speed $v_0$ from an annular die onto a core, the diameter of which is smaller than the diameter of the annular nozzle, with simultaneous stretching, cooling the melt and thus converting it into a substantially unoriented tube which fits the core as a gas-tight sleeve, passing the tube with a speed $v_1 > V_0$ to a stretching zone where a stretching gas is introduced under excess pressure through the core, heating the tube in the stretching zone to a temperature at which stretching is to be performed, stretching the tube by a further increase in speed to $v_2 > v_1$ and by means of the gas volume included in the interior of the tube under pressure, cooling the tube during and/or after stretching it, and finally collapsing it and winding it up, if desired. The stress which causes the tube to be drawn on the core is produced by the traction exerted by a first conveyor system. This causes a close contact and a gas-tight fitting of the congealing tube to the core.

For performing the process of the present invention, the polyester melt is extruded with a defined speed $v_0$ from an annular die, which preferably faces vertically downwardly, and onto a cooled, generally cylindrical core which serves to calibrate the dimensions of the unoriented tube and will be called calibrating core in the following. The calibrating core is mounted concentrically within the annular die and insulated against heat-conduction from the surrounding die; its diameter is smaller than that of the annular die. The melt flows by itself onto the calibrating core, solidifies due to the loss of heat upon contacting the internally cooled calibrating core, and is drawn over the calibrating core by means of axially acting forces. The stress required causes radial forces to become effective in the elastic range of the solidified tube, which establish a gas-tight contact between the unoriented tube and the calibrating core. Preferably, the diameter of the calibrating core should be about 5 mm., generally not more than 30 mm., smaller than the diameter of the die.

The contact between the melt and the calibrating core facilitates a sufficiently rapid heat flow, so that an unoriented tube may be obtained in the amorphous state. The line of contact of the relatively fluid melt upon the calibrating core may be disturbed by local effects so that bubble-like air occlusions may occur. Advantageously this is avoided by pressing the tubular film down when it strikes the core, this being effected by means of an air blast directed concentrically on the tube near the line of contact, in a direction which forms an angle from 1° to 20° to the horizontal, to the section of the tube between the die and the line of contact. The air blast may be produced by an annular nozzle mounted near the line of contact. A cooling medium, normally water, is passed through the calibrating core.

It may be of advantage, in particular at relatively high operating speeds, to improve the cooling effect by an additional external cooling, by means of a directly acting cooling fluid, generally water, the cooling medium being passed along the outer surface of the tubular film gliding over the calibrating core.

By means of a conveyor system, the cooled tubular film is drawn-off at a speed $v_1$ which is higher than the delivery speed $v_0$ of the melt from the die. The changes in film thickness and tube diameter caused by the draw-off effect of the conveyor means are best expressed by the ratio of the cross-sectional area of the annular slot at the die orifice to the cross-sectional area of the amorphous tubular film. In the process according to the present invention, this ratio, also called "die draw-off," is preferably between approximately 1.5 : 1 and 20 : 1.

The conveyor means permits the introduction of a gas into the pressure area of the stretching zone which begins at the lower end of the calibrating core. According to the invention, this gas, under pressure, is introduced into the interior of the tube by way of a feed pipe extending through the calibrating core. If the conveyor means is mounted beneath the calibrating core, it acts on the film section between the core and the heating zone in such a way that the tubular film is not bent and there remains at least a small passage for introducing the expanding gas. In this manner, damaging of the tube and the formation of edges and bends are avoided with certainty.

There may be used, for instance, a pair of traction rolls whose width is smaller than the width of the collapsed tubular film. Thus, under the tractive action of this pair of rolls, the gas-filled, preferably air-filled, tubular film is flattened only in its center portions, while the protruding edges form air-filled beads, which guarantee an equalization of the gas within the entire pressure area of the stretching zone. Instead of a pair of rolls there may be used a pair of endless circulating conveyor belts which have a high degree of frictional adhesion to the film material. The conveyor belts are also of smaller width than the collapsed tubular film. As a further, preferred modification, the conveyor belts or similar mechanical devices may act on the section of film sliding over the calibrating core. In this case, it is advantageous to have the draw-off means act on as large a section of the circumference of the tubular film as possible, by adapting the shape of the draw-off means to the shape of the tube.

The amorphous tube then passes a heating zone where it is heated to the stretching temperature, which is above the glass transition temperature and below the melting temperature of the plastic material in question. Heating is effected by means of a hot gas, preferably hot air, which is circulated in a suitable device along the tubular film, advantageously in a direction opposite to the direction of travel of the film. Alternatively, heating of the film may be effected with other means, e.g. infra-red radiation.

The stretching temperature is attained in the lower part of the heating zone, and here multiaxial stretching begins. Near the lower end of the heating zone stretching is practically completed. The pull required for longitudinal stretching is provided by a conveyor mechanism, normally a pair of draw-off rolls, which impart to the stretched and collapsed tubular film a speed $v_2$ which is higher than the speed $v_1$ of the unoriented tube. Stretching is performed by means of the volume of gas included in the pressure area of the stretching zone. The gas pressure required for stretching depends on the pull-stretch characteristics of the film, the temperature of the tube during stretching, stretching ratios and stretching speed, and the diameter of the stretched tube. In the case of polyethylene terephthalate, the pressure should advantageously be between 0.02 and 0.8 kg/cm². Stretching is performed by an increase of the tube diameter in the area where the amorphous tube reaches the stretching temperature. A specific interior pressure and specific ratio of speed $v_2$ to speed $v_1$ will result in a specific tube diameter, a specific ratio of transverse stretching and a specific ratio of longitudinal stretching. The ratios of transverse stretching should preferably be between 4.0 and about 4.8 and the ratios of longitudinal stretching between about 3.3 to about 3.8. By cooling the stretched tube, which may be effected by the surrounding air in the work shop or may be accelerated by providing a cooling zone immediately adjacent the heating zone, the orientation of the tube thus obtained may be set. Subsequently, the tubular film is collapsed, e.g. by means of several pairs of rolls which are so arranged that the distances between the individual pairs become progressively smaller in the direction of travel of the film, and by the above mentioned pair of squeeze rolls. Upon leaving the squeeze rolls, the tubular film may be wound up. Alternatively, one or two edges of the collapsed tube may be trimmed before it is wound up, so that flat sheets of film are produced.

During the entire process the direction of travel of the thermoplastic material is preferably vertically or substantially vertically downwards. However, it is possible, although in most cases not preferable, to employ a direction of travel which deviates substantially from the normal. Alternatively, the material may be deviated from the initial direction of travel at any point of the process and processing can be continued in the new direction.

Suitable linear polyesters which may be converted into multiaxially stretched tubular films according to the present invention are such compounds as have been obtained by polycondensation of reactive derivatives of dicarboxylic acids with diols. Polycondensates of aromatic dicarboxylic acids, in particular benzene dicarboxylic acids, with aliphatic diols, particularly those having up to six carbon atoms, e.g. polyethylene terephthalate, are preferred for use in the process of the present invention.

The apparatus according to the present invention comprises an extruder provided with an annular die 1, and in the direction of travel of the tubular film, adjacent to the die a calibrating core 2 with interior cooling and a diameter which is smaller than the diameter of the nozzle orifice, a tube 8 extending through the die core 1b and the calibrating core 2 for feeding gas under pressure into the interior of the tube, a first conveyor system accelerating the tubular film from a speed $v_0$ to speed $v_1$, a heating chamber 5 where the tubular film is heated to the temperature required for stretching, collapsing elements 7 for the tubular film, and a second conveyor system 6, which accelerates the tubular film from speed $v_1$ to speed $v_2$ and delivers it from the apparatus.

Advantageously, the gas feed pipe and the feed and withdrawal tubes for the cooling medium pass through an extension of the calibration core, the extension extending through the entire length of the die mandrel in a borehole and being centered and held therein by suitable holding devices.

The calibrating core consists of highly heat-conductive, generally metallic, material. Its length is determined by the throughput and heat conductivity of the thermoplastic material to be processed and by the desired thickness of the finished tube. In many cases it is in the range of from 150 to 400 mm. Preferably, the calibrating core is of cylindrical shape, but its shape may also deviate from the cylindrical. Nor is it necessary that the diameter of the core be constant over its entire length. It is also possible to employ a core the diameter of which increases or decreases in the direction of travel of the tube. It is, however, essential that the diameter of the calibrating core be smaller than that of the die in the line of contact of the melt.

The first conveyor system may act on the outer walls of the tubular film in the area between the calibrating core and the heating zone or immediately at the calibrating core. In the first case, the conveyor system advantageously consists of a pair of draw-off rolls or endless conveyor belts, the width of the rolls or belts, respectively, being smaller than the width of the collapsed tubular film. The pair of rolls or belts are so moved in relation to each other that they draw the tube downwardly. The draw-off rolls may be hollow cylinders mounted on shafts of greater width and smaller diameter. When endless conveyor belts are used, they should be provided with studs made of rubber or another resilient material of high frictional adhesion. In the second case, a draw-off conveyor belt is arranged on each side of the calibrating core. This avoids any deformation of the tube, so that the entire interior cross-sectional area of the tube below the calibrating core can be utilized for passing the gas into the pressure area of the stretching zone.

If a heating chamber is used which operates by means of infrared radiation, the infra-red radiator consists preferably of a hollow cylinder rotating about the axis of the tubular film and having disposed therein, at the inner wall in radially symmetrical arrangement infra-red radiators, advantageously of the same radiation intensity.

Figure 6A:
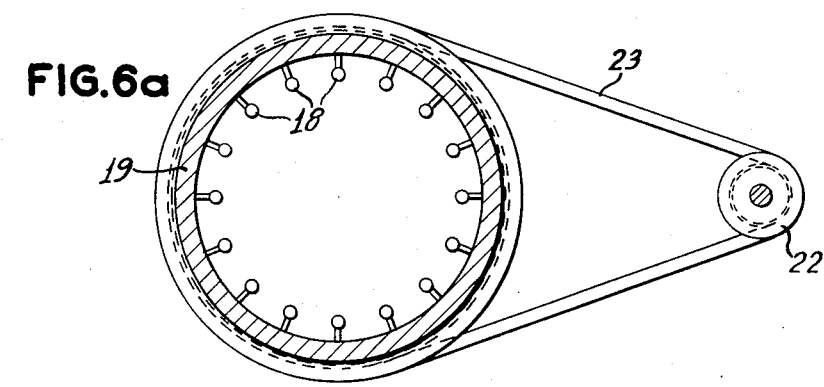

Advantageous arrangements for the performance of the process of the present invention are illustrated by reference to the accompanying drawings in which:

FIG. 1 is a view in longitudinal cross-section through a preferred embodiment of a complete apparatus according to the present invention, FIG. 2 is a sectional view in elevation, with portions of the view being taken in two planes, through the upper part of the apparatus of FIG. 1 and at a larger scale, FIG. 3 is a top view of a conveyor mounted below the calibrating core 2 of FIG. 1, FIG. 3a is a sectional view taken on the line A-B of FIG. 3, FIG. 4 is a view in elevation of a different type of conveyor positioned below the calibrating core 2 of FIG. 1, FIG. 4a is a sectional view taken on the line C-D of FIG. 4, FIG. 5 is a view in elevation of the draw-off apparatus of FIG. 4 shown mounted adjacent to the calibrating core 2 of FIG. 1, FIG. 5a is a sectional view taken on line E-F of FIG. 5, FIG. 6 is a view in longitudinal section through a modification of the heating chamber 5 shown in FIG. 1, FIG. 6a is a sectional view taken on line G-H of FIG. 6, and FIGS. 7 to 9 are graphs showing the behavior of a polyethylene terephthalate tube in the process of the invention under varying conditions.

Referring to the drawings, the polyester is extruded at a speed $v_0$ from an annular die 1 which is directed vertically downward. Immediately below the die orifice 1a is mounted the coolable calibrating core 2, the diameter of which is somewhat smaller than the inner diameter of the die orifice 1a. Cooling of the calibrating core is effected by means of a cooling fluid, which is fed from without to the calibrating core through supply means not shown. The polyester melt strikes the calibrating core 2 at the line of contact L, the distance of which to the die orifice is determined not only by the viscosity of the melt but also by the difference between the diameter of the annular die and that of the calibrating core and by the traction provided by the conveyor element 4. The line of contact is advantageously fixed by the pressure of an air-blast emitted by the slot die 3 arranged concentrically around the calibrating core 2. The cooled, unoriented tube S is drawn off by the pair of draw-off rolls 4 at a speed $v_1 > v_0$.

The amorphous tube then passes through the heating chamber 5 where it is heated to the stretching temperature. For this purpose, hot air is fed into the heating chamber 5a, passes it from the lower to the upper end, and leaves it at 5b. Stretching is performed in the lower part of the heating chamber, along line 1. The required longitudinal stretching is effected by the pair of squeeze rolls 6, which imparts a speed $v_2 > v_1$ to the stretched and, by means of rolls 7 arranged in pairs, collapsed tubular film. The distance of the rolls belonging to the same pair of rolls decreases in the direction of travel of the film. The excess pressure required for transverse stretching is produced by the gas introduced through the fed pipe 8 of the die mandrel 1b and the calibrating core 2 into the pressure zone R.

FIG. 2 is a detail view of the upper part of the apparatus of FIG. 1 at a larger scale and shows, in addition, an external cooling of the tube by a cooling fluid. Numeral 9 designates the supply pipe and 10 the delivery pipe for the cooling fluid and 8 is the feed pipe for the expanding gas.

A device for external water cooling, e.g. that described in British Pat. No. 822,704, includes two concentric tubes, an inner tube 11 and an outer tube 12, with sealing elements 13 and a suction chamber 14 at the lower ends of the tubes. The cooling water is introduced into the double tube formed by the two concentric tubes at 9a, is passed along the tubular film and in countercurrent flow thereto through the inner tube 11, then directed into the outer tube 12, and leaves the cooling device at 10a, at the lower end of the apparatus above the upper sealing element. Any residual water is removed in the suction chamber 14.

FIGS. 3 and 3a show a conveyor mounted below the calibrating core 2, the conveyor including the rubber-covered draw-off rolls 15 which are mounted on the shafts 16. The rolls 15 squeeze only the central portion of the amorphous tube S.

FIG. 4 shows a different type of conveyor which may be mounted below the calibrating core 2. This conveyor includes a pair of draw-off belts 17 which are covered with rubber or some other resilient material. The draw-off belts are moved in the direction of the arrows by the sprockets 17a and from FIG. 4a it is particularly apparent that only the central portion of the tube S is squeezed, while the edges form air-filled beads.

In FIGS. 5 and 5a, a construction is shown in which the drawoff belts 17 of FIG. 4 are mounted adjacent to the calibrating core 2.

FIG. 6 is a view in longitudinal section through a heating chamber 5 which is operated with infra-red radiation, as distinguished from the heating chamber in FIG. 1 in which hot air is employed. As shown in FIGS. 6 and 6a, the infra-red radiators 18 are mounted within the rotating cylinder 19. The energy required to produce the desired heat is supplied through the slip rings 20. The cylinder 19 is driven by the motor 21, the V-belt pulley 22, V-belt 23, and the V-shaped annular groove 24.

Figure 7:
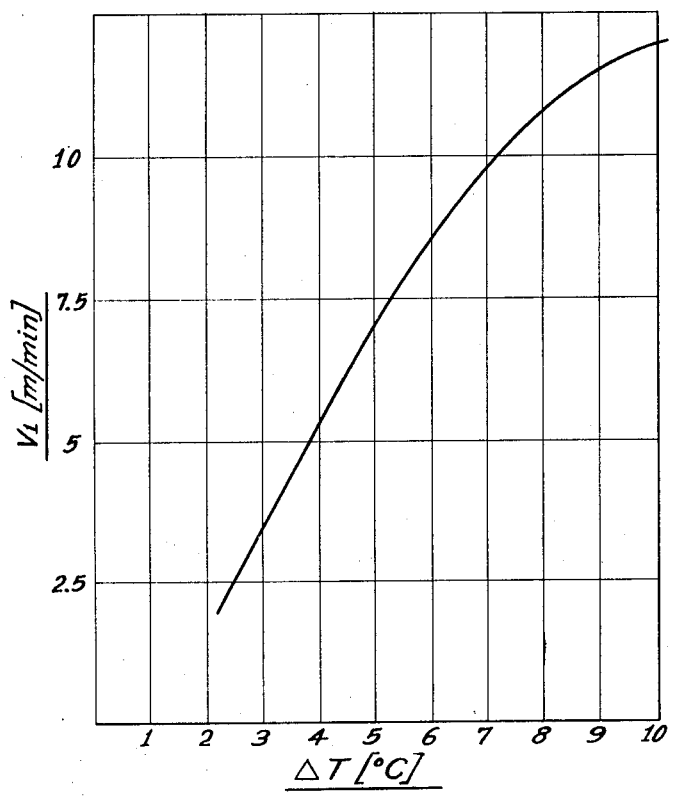

FIG. 7 shows the speed $v_1$ of a tubular film of polyethylene terephthalate in meters per minute as a function of the amount of heat conducted away by the cooling system, the amount of heat conducted away being expressed as the increase in temperature (of the cooling means) $\Delta T$ at a constant throughput of cooling fluid and a constant linear contact of 300 mm. between the tube and the calibrating core. A cooling effect sufficient for the production of the unoriented tube is obtained in many cases with a temperature difference between the cooling fluid fed in and the cooling fluid discharged of not more an 8°C.

Figure 8:
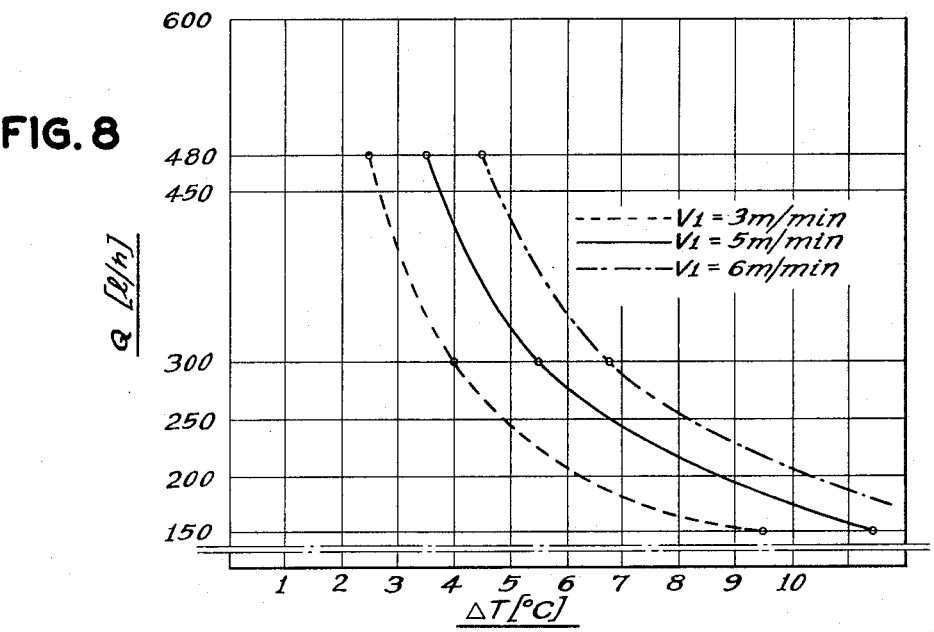

FIG. 8 shows the dependence of the temperature gradient illustrated in FIG. 7 on the amount of cooling fluid, in liters per hour, at varying speeds $v_1$, with the thickness of the tube and the length of linear contact between the tube and calibrating core being constant. It can be seen from FIG. 8 that a tubular speed $v_1$ of 3 m/min will require a throughput of cooling water of 160 l/h, a speed of 5 m/min a throughput of 220 l/h, and speed of 6 m/min a throughput of 260 l/h.

Figure 9:
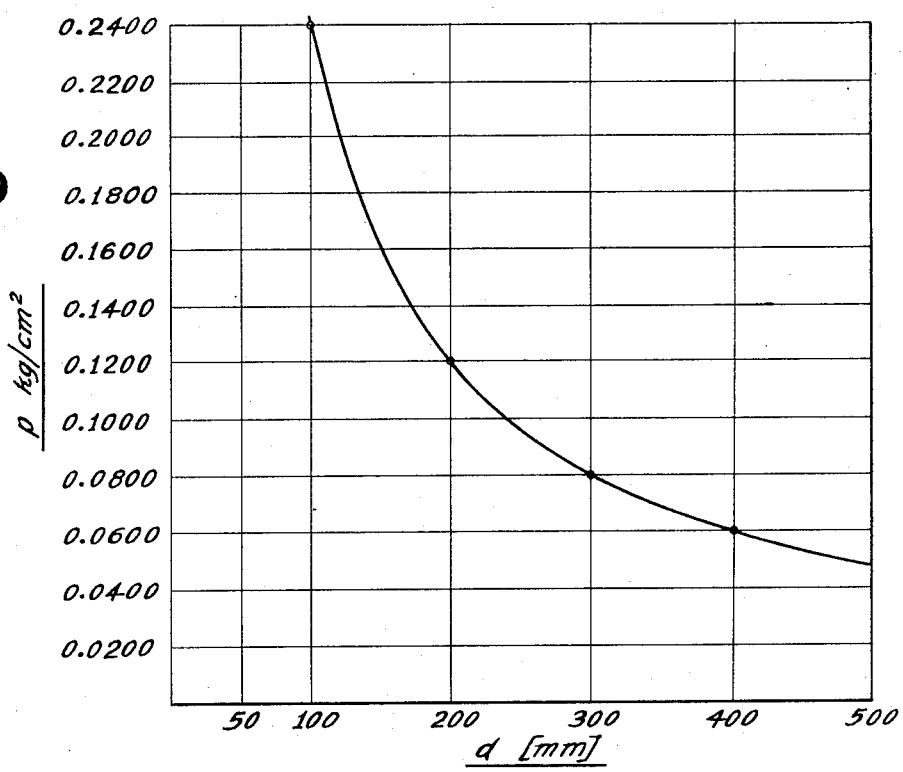

FIG. 9 shows the interior pressure 1 required for transverse stretching, from the diameter d measured in millimeters, of the stretched tubular film, the stretching temperature and the ratio of longitudinal and transverse stretching being the same. It is apparent from FIG. 9 that the interior pressure required for stretching the tube changes in a characteristic manner with the diameter of the oriented tube, i.e. according to a hyperbolic function.

The invention will be further illustrated by reference to the following specific example:

EXAMPLE 1

Polyethylene terephthalate having a glass transition temperature of 76°C., a crystallization temperature of 132° C. and a melting point of 260° C. (at a reheating speed of 2°C./min) was fed into an extruder in the form of a dry granulate, where it was melted and passed under pressure to an annular die. The melt was extruded at a viscosity of 1700 poises and a temperature of 270°C. from the annular slot die, which had an inner diameter of 50 mm. and a slot width of 0.7 mm., passed vertically downwardly, and onto a water-cooled, cylindrical, interior calibrating core having an outer diameter of 30 mm. In order to avoid local disturbances between the melt and the calibrating core, an annular air nozzle was mounted near the line of contact L, the jet of the nozzle enclosing an angle of 110° with the section of tube between the extruder die and the contact line L and pressing the tubular melt with a pressure of 0.01 kg/cm² against the cooled calibrating core. This causes a solidification and simultaneous fitting of the thermoplast to the calibrating core immediately after it has passed the line of contact of the tubular melt on the calibrating core. The solidified, unoriented tube thus obtained was drawn downwardly at a speed $v_1$=5 m/min. by pneumatically pressed feed rolls. At an extruder output of 12.7 kg/h and a draw-off rate from the die of 4.7 : 1, the tube thus obtained had a wall thickness of 250μ. After passing the feed rolls the cooled tube was conveyed into a heating area and heated to a stretching temperature of 83°C. by means of air at 90°C. flowing counter-currently to the direction of feed of the tube. The difference between the speed $v_2$ and the speed $v_1$ caused a longitudinal stretching of the tube at a ratio of 3.15 to 1. Transverse stretching was effected by means of air passed into the stretching zone R under a pressure of $p$=0.18 kg/cm². During transverse stretching, the tubular film was inflated to a maximum diameter of 130 mm., while the wall thickness thereof was reduced to 18μ. The ratio of transverse stretching was 4.33 to 1. The stretched tube then was cooled to a temperature below 70°C. by means of a cold air nozzle mounted adjacent the heating area, collapsed to a width of 204 mm. by means of a pair of guide rolls, and finally reeled up.

It was not to be anticipated from the prior art that, when processing melts of low viscosity with the use of an interior calibrating system, the radial forces caused by longitudinal stretching would be sufficient to seal the stretching zone R in a gas-tight manner since the latter zone is under relatively high pressure (see FIG. 1). This surprising discovery permits a considerable simplification of the process and the use of much simpler apparatus.

The means employed for the production of an unoriented tube, which, according to earlier processes, required pressure control, is replaced in the process of the present invention by an interior calibrating means which requires no pressure. Thus, the difficult control of the interior pressure during the processing of the amorphous tube and the use of special squeeze rolls necessary for sealing two zones of differing interior pressure can be dispensed with. Further, breaking of the film edges by the squeeze rolls, which hitherto was inevitable, is avoided, because rolls or draw-off belts can be used according to the invention which are smaller in width than the tube.

As a particular advantage of the process of the present invention, the volume of gas required for stretching can be introduced in a simple way into the area R by means of the interior calibrating system and through the section of the tube diameter protruding at both sides of the draw-off rolls or belts, respectively. Owing to the gas-tight fitting of the unoriented tube to the calibrating core, regulation of the gas pressure in he stretching zone R is no longer necessary, after an initial adjustment, since the volume of gas required for stretching is tightly sealed between the calibrating core and the pair of draw-off rolls. A further advantage of the present invention is the fact that the diameter and wall thickness of the stretched tube obtained are of high uniformity although no complicated and expensive control mechanisms for regulating the stretching pressure are required. The tubes thus produced are therefore highly suitable for the production of shrinkable packages, because they shrink very evenly due to the qualities stated above.

It will be obvious to those skilled in the art that many modifications may be made within the scope of the present invention without departing from the spirit thereof, and the invention includes all such modifications.

What is claimed is:

1. A process for the continuous production of a multiaxially stretched tubular film of a thermoplastic linear polyester having a low melt viscosity, by extruding a melt of the polyester in a substantially vertically downward direction from an annular die at a speed $v_0$ onto a cooled interior calibrating core of a diameter smaller than that of the die while stretching the melt in the longitudinal direction and cooling the melt to form a substantially unoriented tube which engages the core in a gas-tight manner and then passes immediately at a speed $v_1$ to a pressure area downstream of the cooled calibrating core, the pressure being applied to the interior of the tube to radially expand the tube heated to its expansion temperature and the speed $v_1$ being adjusted depending upon the applied pressure to produce a gas-tight seal, the gas-tight seal between the tube and the core being produced solely by drawing the unoriented tube over the core at a die draw-off ratio in the range of about 1.5 : 1 to 20 : 1 and in the absence of external superatmospheric pressure, and conveying the tube at a speed $v_1 > v_0$ to a heated stretching zone in which the tube is heated to the stretching temperature, lengthwise and radially stretching the tube by means of a further increase in linear speed $v_2 > v_1$ and by increasing the pressure in the tube, and cooling the tube.

2. A process according to claim 1 in which the tube is accelerated from speed $v_0$ to speed $v_1$ without being bent and without blocking a passage therethrough for expanding gas.

3. A process according to claim 1 in which the tube is accelerated from speed $v_0$ to speed $v_1$ by translational force applied to a portion of the tubular film in engagement with the core.

4. A process according to claim 1 in which the tube is heated to the stretching temperature by hot air.

5. A process according to claim 1 in which the tube is heated to the stretching temperature in infra-red radiation.

* * * * *